(12) United States Patent
Binhussain et al.

(10) Patent No.: US 8,669,303 B2
(45) Date of Patent: Mar. 11, 2014

(54) SYNTHETIC COMPOSITION OF MARBLE AND METHOD OF PRODUCTION

(75) Inventors: Mohammed A Binhussain, Riyadh (SA); Samah Mohammed El-Bashir Abdulaziz Abdul wahab, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 103 days.

(21) Appl. No.: 13/214,263

(22) Filed: Aug. 22, 2011

(65) Prior Publication Data
US 2012/0091618 A1    Apr. 19, 2012

(30) Foreign Application Priority Data
Oct. 19, 2010    (SA) .................................. 110310783

(51) Int. Cl.
*C09D 5/29*    (2006.01)
(52) U.S. Cl.
USPC ........................................................ 523/171
(58) Field of Classification Search
USPC ........................................................ 523/171
See application file for complete search history.

(56) References Cited

U.S. PATENT DOCUMENTS

2010/0311867 A1*  12/2010  Kim .............................. 523/171

\* cited by examiner

*Primary Examiner* — Edward Cain
(74) *Attorney, Agent, or Firm* — Raj Abhyanker, P.C.

(57) ABSTRACT

A method of producing a synthetic composition having properties of marble includes blending a polymer resin with a stone gravel bit to form a mixture. The method also includes processing the mixture of polymer resin with the stone gravel bit to produce a synthetic marble composition through a polymerization of the mixture that is cast in a casting cell. Further, the method may include preparing a mold to form a casting cell, removing air bubbles from the mixture of polymer resin with the stone gravel bit to enhance a physical property of the synthetic marble material, casting the mixture in the casting cell, polymerizing the cast mixture through an autoclave polymerization of the mixture at a pressure ranging from 1 to 10 atmospheres and a temperature ranging from 50° to 100° C. to prepare the synthetic marble material composition, and curing the synthetic marble sheet in an oven.

9 Claims, 5 Drawing Sheets

SYNTHETIC COMPOSITION OF MARBLE AND METHOD OF PRODUCTION

CLAIM OF PRIORITY

This application claims priority to Saudi Arabia Application Number 110310783 titled "PRODUCTION OF SYNTHETIC MARMOREAL MARBLE" file on Oct. 19, 2010.

FIELD OF TECHNOLOGY

This disclosure relates generally to synthetic marble composition through a polymerization and more particularly, to a method, an apparatus and/or a system of synthetic composition of marble and method of production.

BACKGROUND

Marble may have some aesthetically desirable properties. For example, marble may exhibit an opaque, white, and/or pink color in appearance. Furthermore, marble may exhibit a shiny appearance. Such properties may contribute to the demand for marble. However, marble may be unsuitable in a variety of construction scenarios. Particularly, marble may be too heavy of a material (at 2563 kg/m3 density) for application in areas where safety in case of disaster may be a concern (e.g., an earthquake zone, a liquefaction region, etc.).

Marble is a stone that may need to be naturally mined from the Earth. As such, it may be extracted having irregularities in form and composition. As such, marble having certain sizes and properties may be sold at a premium because of scarcity. In addition, the mining of marble may have adverse environmental impacts. For example, the mining of marble may involve the use of solvents and chemicals which may contaminate soil and ground water with toxins.

SUMMARY

Disclosed are a method, a system and/or an apparatus of synthetic composition of marble and method of production. In one aspect, a method includes blending a polymer resin with a stone gravel bit to form a mixture. The method also includes processing the mixture of polymer resin with the stone gravel bit to produce a synthetic marble composition through a polymerization of the mixture that is cast in a casting cell.

The method of producing a synthetic composition having a physical property of marble may include preparing a mold to form a casting cell. The method may also include removing air bubbles from the mixture of polymer resin with the stone gravel bit to enhance a physical property of the synthetic marble material.

Further, the method may include casting the mixture in the casting cell, and polymerizing the cast mixture through an autoclave polymerization of the mixture at a pressure ranging from 1 to 10 atmospheres and a temperature ranging from 50° to 100° C. to prepare the synthetic marble material composition. In addition, the method may include curing the synthetic marble sheet in an oven at a temperature of at least 100° C., and separating a product from the casting cell.

The method may include processing the mixture with the stone gravel bit including 40% to 60% of the mixture by weight. The method may also include blending the stone gravel bit with a polymer resin including a nanosilica, an alumina trihydrate, a methylmethacrylate monomer, an azobisisobutyronitrile, an ethylene glycol dimethacrylate, a polymethylmethacrylate material, and a stearic acid.

Further, the method may include processing a mixture of polymer resin with the stone gravel bit with methylmethacrylate monomer including 90%-100% of the mixture by weight, nanosilica including 0.05%-0.15% of the mixture by weight, alumina trihydrate including 0.05%-0.15% of the mixture by weight, azobisisobutyronitrile including 0.002%-0.015% of the mixture by weight, and ethylene glycol dimethacrylate including 0.005%-0.015% of the mixture by weight, and stearic acid including 0.005%-0.02% of the mixture by weight. In addition, the method may include preparing the mold from a group including teflon and glass.

The method may include and forming the casting cell with a first portion and a second portion of glass plate from a group including a tapered glass plate and a reinforced glass plate. The method may also include separating the first portion of glass plate from the second portion of glass plate with a gasket, and ensuring the width of the gasket is substantially similar to the desired thickness of the sheet of the synthetic marble composition.

The method may also include creating the gasket from polyvinyl chloride, blending the polymer resin with the stone gravel bit in a vacuum in order to avoid existence of the air bubbles, and selecting the stone gravel bit from one of a group including a marble, a granite, and a basalt stone.

In another aspect, a composition synthetic composition having properties of marble includes a polymer resin including one of nanosilica, alumina trihydrate, a methylmethacrylate monomer, azobisisobutyronitrile, ethylene glycol dimethacrylate, polymethylmethacrylate material and Stearic acid. The composition also includes a stone gravel bit blended with the polymer resin. The mixture of polymer resin with the stone gravel bit is processed to produce the synthetic marble composition through an autoclave polymerization of the mixture that is cast in a casting cell at a pressure ranging from 1 to 10 atmospheres and a temperature ranging from 50° to 100° C. to prepare the synthetic marble material composition.

The methylmethacrylate monomer may include 90%-100% of the mixture by weight. The nanosilica may include 0.05%-0.15% of the mixture by weight. The alumina trihydrate may include 0.05%-0.15% of the mixture by weight. The azobisisobutyronitrile may include 0.002%-0.015% of the mixture by weight. The ethylene glycol dimethacrylate may include 0.005%-0.015% of the mixture by weight. The stearic acid may include at 0.005%-0.02% of the mixture by weight.

The mold may be prepared to form a casting cell. The air bubbles may be removed from the mixture of polymer resin with the stone gravel bit to enhance a physical property of the synthetic marble material. The mixture may be cast in the casting cell. The synthetic marble sheet may be cured in an oven at a temperature of 100° C. The product may be separated from the casting cell.

The stone gravel bit may be chosen from a group including a marble, a granite, and a basalt stone. The composition may be resistant to marking such that when a liquid is spilled on the composition a stain will not be left. The composition may be resistant to bacteria and micro-organismic growth because the surface of the composition has relatively low porosity.

The composition may have high flexibility during formation processes, making it easier to be shaped than natural marble, with negligible loss during making. The composition may be different colors because of the different color properties of the stone gravel bit blended with the polymer resin. The composition may be durable to heavy weights without cracking because of its relatively high tensile strength. The composition may have higher thermal insulation properties than natural marble because of the composition's lower thermal conductivity than marble.

The methods and systems disclosed herein may be implemented in any means for achieving various aspects. Further, those of skill in the art will recognize certain modifications, permutations, additions and sub-combinations thereof. Therefore, the following appended claims and claims hereafter introduced be interpreted to include all such modifications, permutations, additions and sub-combinations as are within their true spirit and scope. In addition, it will be appreciated that the various operations, processes, and methods disclosed herein may be performed in any order. Other features will be apparent from the accompanying drawings and from the detailed description that follows.

BRIEF DESCRIPTION OF THE DRAWINGS

Example embodiments are illustrated by way of example and not a limitation in the figures of accompanying drawings, in which like references indicate similar elements and in which.

Other features of the present embodiments will be apparent from accompanying Drawings and from the Detailed Description that follows.

DETAILED DESCRIPTION

Disclosed are a method, an apparatus and/or a system of synthetic composition of marble and method of production. Although the present embodiments have been described with reference to specific example embodiments, it will be evident that various modifications and changes may be made to these embodiments without departing from the broader spirit and scope of the various embodiments.

Figure 1:
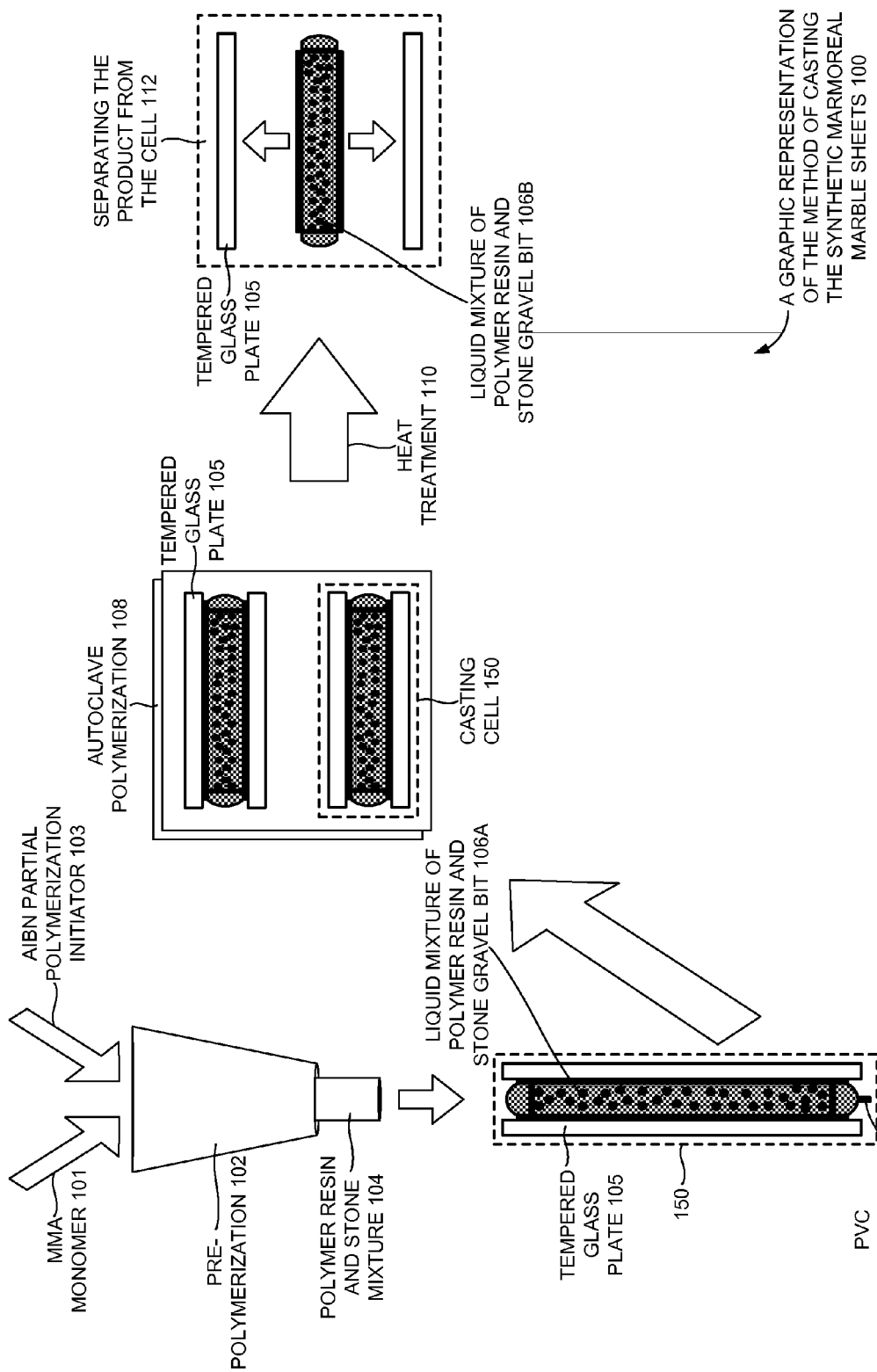
FIG. 1 is a graphic representation of the method of casting the synthetic marmoreal marble sheets, according to one or more embodiments.

FIG. 1 shows a graphic representation of a method of casting synthetic marmoreal marble sheets 100. The method of casting synthetic marmoreal marble sheets 100 includes mixing of Methylmethacrylate (MMA) monomer 101 and Azobisisobutyronitrile (AIBN) partial polymerization initiator 103. The MMA monomer 101 and (AIBN) partial polymerization initiator 103 may be mixed in a mixing container. The MMA monomer may be an organic compound with chemical formula $CH_2=C(CH_3)COOCH_3$. The AIBN partial polymerization initiator 103 may be used as a radical initiator which may be used to process the polymerization. The MMA monomer 101 and AIBN partial polymerization initiator 103 may be applied to free radical polymerization. Applying free radical polymerization process of Methylmethacrylate 101 and use of AIBN with a preferred ratio of 0.005% may initiate polymerization process. The MMA monomer 101 and AIBN partial polymerization initiator 103 may be subjected to pre-polymerization 102. The efficiency of AIBN may be increased when it is subjected to pre-polymerization prior to introduction in the polymerization process. The outcome of the pre polymerization process may be a Polymethylmethacrylate (PMMA)-MMA solution. The pre-polymerized PMMA-MMA solution may be mixed with nanosilica, alumina trihydrate, ethylene glycol dimethacrylate, and Stearic acid constituents which may form a polymer resin. The polymer resin may be mixed with granules of marble remains and colors. The granules of marbles remains and colors may form stone gravel bit. The stone gravel bit may be one of marble, granite and a basalt stone. The polymer resin and stone gravel bit are blended together to form a mixture 104. The polymer resin and the stone gravel bit may be mixed 104 in a vacuum to avoid existence of air bubbles. The polymerization process takes place in the absence of oxygen as it may affect solidity of the product. The stone gravel bit may be dipped for 6-8 hours in MMA monomer solution containing low concentration of AIBN. Dipping the stone gravel in MMA solution containing low concentration of AIBN may remove surface metallic impurities.

The pre polymerized PMMA-MMA solution may be mixed with nanosilica wherein nanosilica may constitute 0.05%-0.15% of the mixture by weight. The solution may be mixed with alumina trihydrate wherein alumina trihydrate may constitute 0.05%-0.15% of the mixture by weight. It may be preferable to add polymerization initiator AIBN 103 in an amount of 0.002%-0.015% of the mixture by weight. The solution may be mixed with ethylene glycol dimethacrylate wherein ethylene glycol dimethacrylate may be used practically in an amount 0.005%-0.015% of the mixture by weight. Further, the solution may be mixed with stearic acid constituting 0.005%-0.02% of the mixture by weight. The stone gravel bit may constitute 40%-60% of the mixture by weight.

In one embodiment, mixture of polymer resin and stone gravel 106A may be casted in a preparation cell. The preparation cell may be glass mould which may consist of two plates. The area of the preparation cell may be greater than the area required by the product to observe contraction of the solution during polymerization. The two plates of the glass mold may be reinforced glass. The thickness of the reinforced glass may be 6 mm. The use of reinforced glass plates may be preferred to obtain product transparency and surface softness. The two plates may be separated by a gasket 107 which may be made of Poly vinyl chloride (PVC) 107. The two plates may be placed in a casting cell 150.

In another embodiment, tempered glass plate 105 including liquid mixture of polymer resin and stone gravel bit 106A may be subjected to autoclave polymerization 108. Subjecting the liquid mixture 106A to autoclave polymerization may improve consistency of quality of the product. The process of autoclave polymerization 108 may remove heat of polymerization. The liquid mixture of polymer resin and stone gravel bit 106A that may be cast in the casting cell 150. The mixture may be processed to produce synthetic marmoreal sheets through an autoclave polymerization 108. The Synthetic marmoreal sheets may be prepared using autoclave polymerization 108 under a pressure which may range between 1 to 10 atmospheres and a temperature may range from 50 to 100° C.

In one or more embodiments, the synthetic marmoreal sheet may be cured in an oven at a temperature of greater than 100° C. The liquid mixture of polymer resin and stone gravel bit 106B may be separated from the casting cell 150. The outcome of separating the product from the cell 112 may be synthetic marmoreal sheets.

In an example embodiment, the mixing container and the casting cell 150 may be combined together. The MMA monomer 101 and the AIBN polymerization initiator 103 may be mixed and subjected to pre polymerization 102. The outcome may be pre polymerized PMMA-MMA solution. The pre polymerized PMMA-MMA solution may be mixed with nanosilica, alumina trihydrate, ethylene glycol dimethacrylate and stearic acid and resultant mixture may be polymer resin. The stone gravel may be added to the resultant mixture which forms a liquid mixture of polymer resin and stone gravel bit 106A. The liquid mixture of polymer resin and stone gravel bit 106A may be directly poured into the mold present in the mixing container. The mold present in between the glass plates may be separated by PVC gasket 107. The mixture may be casted in the casting cell 150.

In another example embodiment, the autoclave polymerization 108 and separating the product from the cell 112 may be integrated. The liquid mixture of polymer resin and stone gravel bit 106A poured between the glass plates may be subjected to autoclave polymerization 108. The outcome may be synthetic marble sheets which may be cured in an oven at a temperature of at least. Further, the final product may be separated 112 from the casting cell 150 which may be a liquid mixture of polymer resin and stone gravel bit 106B.

In one example embodiment, dipping the stones impedes the polymerization process and increase adhesion between the stones and PMMA.

In an example scenario, using Stearic acid ($CH_3(CH_2)_{16}$) COOH with ratio 0.015% may prevent product from sticking with a glass mold.

In another example embodiment, nanosilica may be used to control the mixture during preparation to enhance the abrasion resistance of the product.

In another example embodiment, using Alumina trihydrate (ATH) with ratio 0.1% may act as a flame retardant and abrasion resistant material.

In one or more example embodiments, using Ethylene glycol dimethacrylate with ratio 0.01% may increase product solidity.

In another example embodiment, there is provided a composition for artificial marble that may include 10%-60% by weight of an allyl terminated oligomer, 40%-86% by weight of an inorganic filler and 0%-30% by weight of an reactive monomer.

Figure 2:
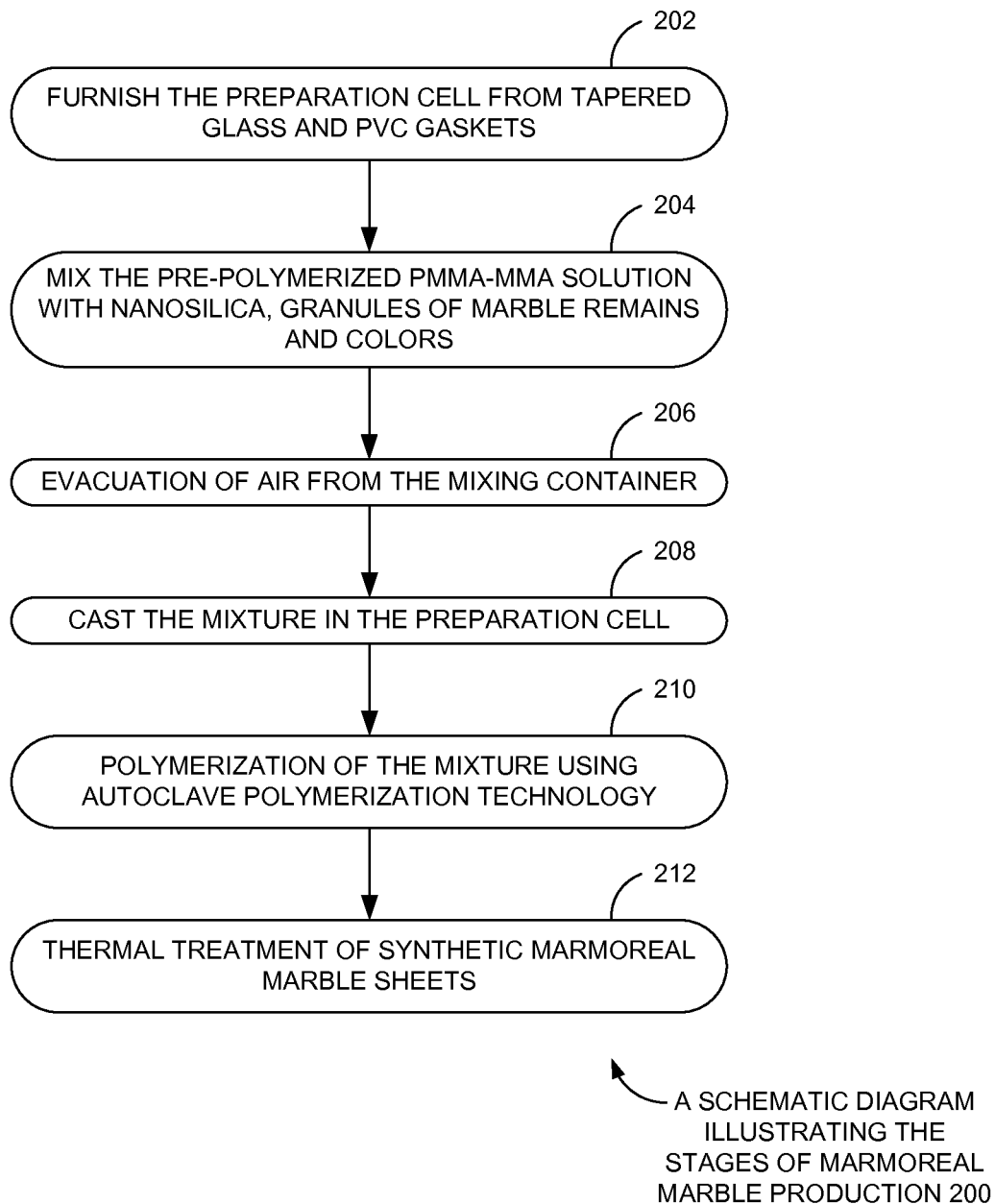
FIG. 2 is a schematic diagram illustrating the stages of marmoreal marble production, according to one or more embodiments.

FIG. 2 is a schematic diagram illustrating the stages of marmoreal marble production, according to one or more embodiments. In one or more embodiments, operation 202 may involve furnishing the preparation cell from the tapered glass and PVC gaskets. In one or more embodiments, operation 204 may involve mixing the pre-polymerized PMMA-MMA solution with nanosilica, granules of marble remains and colors. In one or more embodiments, operation 206 may involve evacuating air from the mixing container. In one or more embodiments, operation 208 may involve casting the mixture in the preparation cell. In one or more embodiments, operation 210 may involve polymerizing the mixture using autoclave polymerization technology. In one or more embodiments, operation 212 may involve providing thermal treatment of synthetic marmoreal marble sheets.

Figure 3:
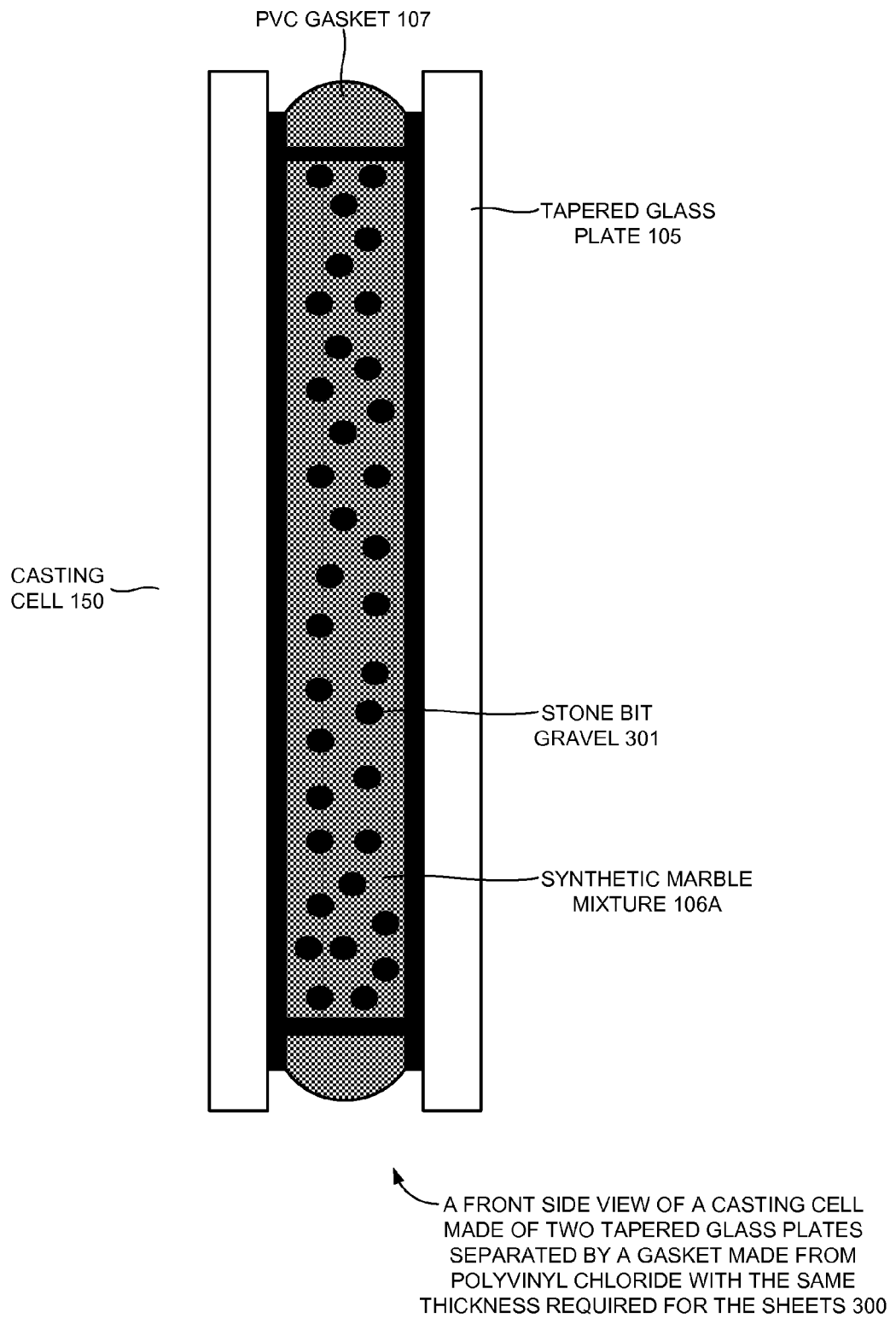
FIG. 3 is a front side view of a casting cell made of two tapered glass plates separated by a gasket made from polyvinyl chloride with the same thickness required for the sheets, according to one or more embodiments.

FIG. 3 is a front side view of the casting cell made of two tapered glass plates separated by a gasket made from polyvinyl chloride with the same thickness required for the sheets 300, according to one or more embodiments. The polymer resin and stone bit gravel 301 mixture may be casted in a preparation cell. The preparation cell may be glass mold which may consist of two plates. The area of the preparation cell may be greater than the area required by the product to observe contraction of the solution during polymerization. The two plates of the glass mold may be reinforced glass. The thickness of the reinforced glass may be 6 mm. The use of reinforced glass plates may be preferred to obtain product transparency and surface softness. The two plates may be separated by a gasket 107 which may be made of Poly vinyl chloride (PVC) 107. The two plates may be placed in the casting cell 150.

Figure 4:
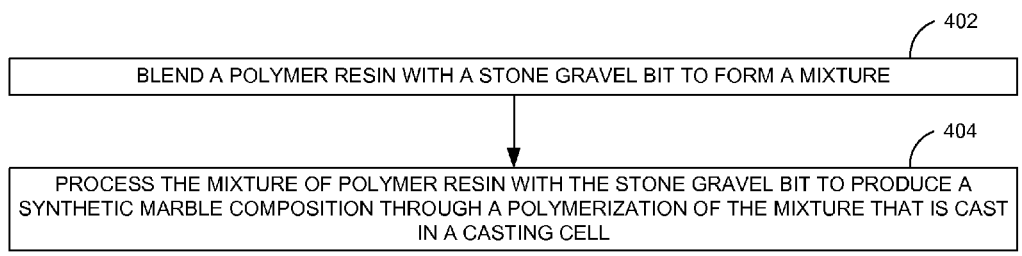
FIG. 4 shows a process flow diagram detailing the operations involved in a method of producing a synthetic composition of marble according to one or more embodiments.

FIG. 4 shows a process flow diagram detailing the operations involved in a method of producing a synthetic composition of marble according to one or more embodiments. In one or more embodiments, operation 402 may include blending the polymer resin with the stone gravel bit to form the mixture. In one or more embodiments, operation 404 may include processing the mixture of the polymer resin with the stone gravel bit to produce synthetic marble composition through a polymerization of the mixture that is cast in the casting cell.

Figure 5:
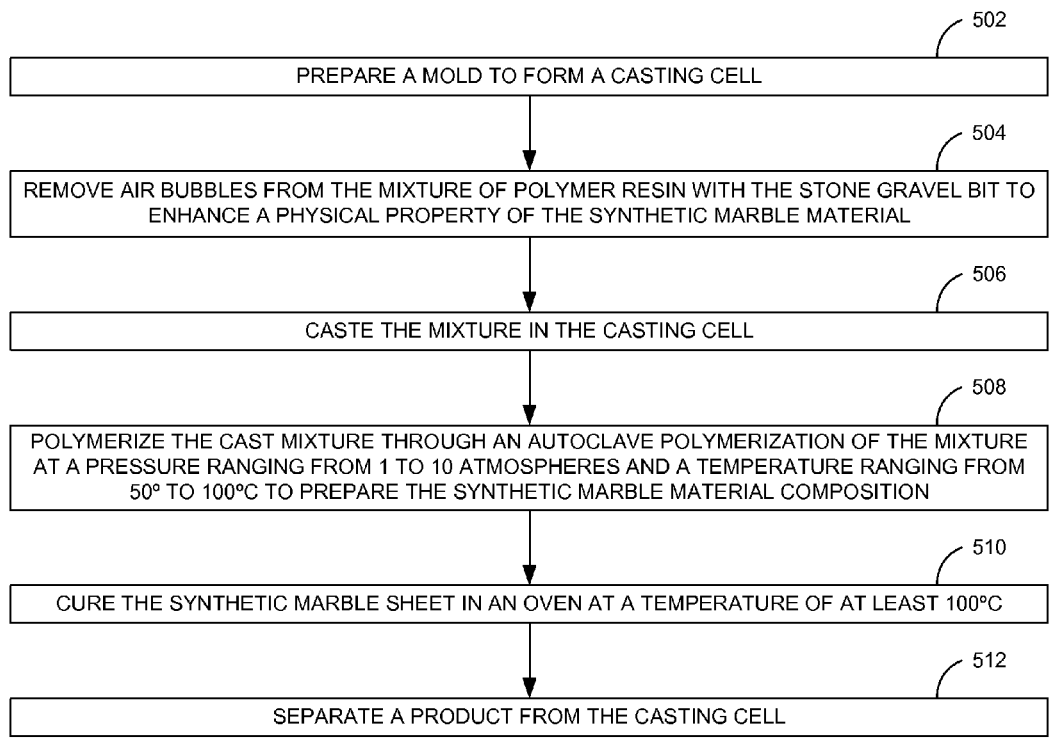
FIG. 5 shows a process flow diagram detailing the operations involved in a method of producing a synthetic composition having a physical property of marble according to one or more embodiments.

FIG. 5 shows a process flow diagram detailing the operations involved in a method of producing synthetic composition having a physical property of marble according to one or more embodiment. In one or more embodiments, operation 502 may include preparing the mold to form the casting cell. In one or more embodiments, operation 504 may include removing air bubbles from the mixture of the polymer resin with the stone gravel bit to enhance the physical property of the synthetic marble material. In one or more embodiments, operation 506 may include casting the mixture in the casting cell. In one or more embodiments, operation 508 may include polymerizing the cast mixture through an autoclave polymerization of the mixture at pressure ranging from 1 to 10 atmospheres and temperature ranging from 50° to 100° C. to prepare the synthetic marble material composition. In one or more embodiments, operation 510 may include curing the synthetic marble sheet in an oven at temperature of greater than 100° C. In one or more embodiments, operation 512 may include separating the product from the casting cell.

Although the present embodiments have been described with reference to specific example embodiments, it will be evident that various modifications may be made to these embodiments without departing from the broader spirit and scope of the various embodiments. Further, those of skill in the art will recognize certain modifications, permutations, additions and sub-combinations thereof. Therefore, the following appended claims and claims hereafter introduced be interpreted to include all such modifications, permutations, additions and sub-combinations as are within their true spirit and scope. In addition, it will be appreciated that the various operations, processes, and methods disclosed herein may performed in any order. Accordingly, the specification and the drawings are regarded in an illustrative rather than a restrictive sense.

What is claimed is:

1. A composition, comprising:
 a polymer resin comprising at least one of a methylmethacrylate monomer, nanosilica, alumina trihydrate, azobisisobutyronitrile, ethylene glycol dimethacrylate, polymethylmethacrylate material and Stearic acid;
 a stone gravel bit blended with the polymer resin,
  wherein the mixture of polymer resin with the stone gravel bit is processed to produce the synthetic marble composition through an autoclave polymerization of the mixture that is castin a casting cell at a pressure ranging from 1 to 10 atmospheres and a temperature ranging from 50° to 100° C. to prepare the synthetic marble material composition;

wherein methylmethacrylate monomer comprises 90%-100% of the mixture by weight, wherein nanosilica comprises 0.05%-0.15% of the mixture by weight, wherein alumina trihydrate comprises 0.05%-0.15% of the mixture by weight, wherein azobisisobutyronitrile comprises 0.002%-0.015% of the mixture by weight, wherein ethylene glycol dimethacrylate comprises 0.005%-0.015% of the mixture by weight, and wherein stearic acid comprises at 0.005%-0.02% of the mixture by weight.

2. The composition of claim 1:

wherein a mold is prepared to form a casting cell, wherein air bubbles are removed from the mixture of polymer resin with the stone gravel bit to enhance a physical property of the synthetic marble material, wherein the mixture is cast in the casting cell, wherein the synthetic marble sheet is cured in an oven at a temperature of at least 100° C., and wherein the product is separated from the casting cell.

3. The composition of claim 1:

wherein the stone gravel bit is chosen from at least one of a group comprising a marble, a granite, and a basalt stone.

4. The composition of claim 1:

wherein the composition is resistant to marking such that when a liquid is spilled on the composition a stain will not be left.

5. The composition of claim 1:

wherein the composition is resistant to bacteria and microorganismic growth because the surface of the composition has relatively low porosity.

6. The composition of claim 1:

wherein the composition has high flexibility during formation processes, making it easier to be shaped than natural marble, with negligible loss during making.

7. The composition of claim 1:

wherein the composition may be different colors because of the different color properties of the stone gravel bit blended with the polymer resin.

8. The composition of claim 1:

wherein the composition is durable to heavy weights without cracking because of its relatively high tensile strength.

9. The composition of claim 1:

wherein the composition has higher thermal insulation properties than natural marble because of the composition's lower thermal conductivity than marble.

* * * * *